United States Patent [19]
Schierling et al.

[11] Patent Number: 5,601,492
[45] Date of Patent: *Feb. 11, 1997

[54] TWO MASS FLYWHEEL FOR A MOTOR VEHICLE TRANSMISSION HAVING A SEPARATE THRUST BEARING BETWEEN THE TWO MASSES

[75] Inventors: Bernhard Schierling, Kürnach; Ralf Till, Euerbach; Jörg Sudau, Niederwerrn, all of Germany

[73] Assignee: Fichtel & Sachs AG, Schweinfurt, Germany

[*] Notice: The term of this patent shall not extend beyond the expiration date of Pat. No. 5,569,088.

[21] Appl. No.: 428,705

[22] Filed: Apr. 25, 1995

Related U.S. Application Data

[63] Continuation-in-part of Ser. No. 322,598, Oct. 13, 1994.

[30] Foreign Application Priority Data

Oct. 15, 1993 [DE] Germany .................. 43 35 207.3
Sep. 14, 1994 [DE] Germany .................. 44 32 625.4

[51] Int. Cl.⁶ ....................................... F16D 3/14
[52] U.S. Cl. .................................. 464/68; 464/24
[58] Field of Search ................... 192/55.4, 208, 192/212, 214; 464/24, 66, 67, 68, 64; 74/574

[56] References Cited

U.S. PATENT DOCUMENTS

| | | | |
|---|---|---|---|
| 288,062 | 4/1959 | Nallinger . | |
| 309,753 | 7/1963 | Peterson . | |
| 4,674,991 | 6/1987 | Tojima et al. | 464/86 X |
| 4,848,551 | 7/1989 | Casper | 464/68 X |
| 5,030,166 | 7/1991 | Wörner et al. | 464/68 X |
| 5,048,658 | 9/1991 | Reik | 464/24 X |
| 5,083,981 | 1/1992 | Förster | 464/68 |
| 5,180,335 | 1/1993 | Maucher et al. | 464/68 X |
| 5,356,339 | 10/1994 | Bochot et al. | 464/68 X |

FOREIGN PATENT DOCUMENTS

| | | |
|---|---|---|
| 0476707 | 3/1992 | European Pat. Off. . |
| 2633683 | 1/1990 | France . |
| 3425161 | 1/1986 | Germany . |
| 8815924 | 5/1989 | Germany . |
| 3841639 | 12/1989 | Germany . |
| 4117584 | 12/1991 | Germany . |

*Primary Examiner*—Daniel P. Stodola
*Assistant Examiner*—Eileen A. Dunn
*Attorney, Agent, or Firm*—Nils H. Ljungman and Associates

[57] ABSTRACT

A two-mass flywheel has a first flywheel mass which can be connected to the crankshaft of an internal combustion engine, and can be provided with a thrust bearing for a hub of a second flywheel. The first flywheel can also be designed in its circumferential area with a radial bearing for the hub. The second flywheel can preferably rotate in synchronization with the first flywheel and can also preferably execute a limited rotation relative to the first flywheel. On this flywheel device, the thrust bearing is oriented so that on one hand, a sufficient supply of lubricant to the thrust bearing is always provided, and on the other hand, so that there is an optimal axial guidance of the hub. The invention teaches that this object can be achieved by a thrust bearing with displacement limit stops for the hub provided on both sides of the hub and extending to the radial bearing.

21 Claims, 8 Drawing Sheets

I-I

II-II

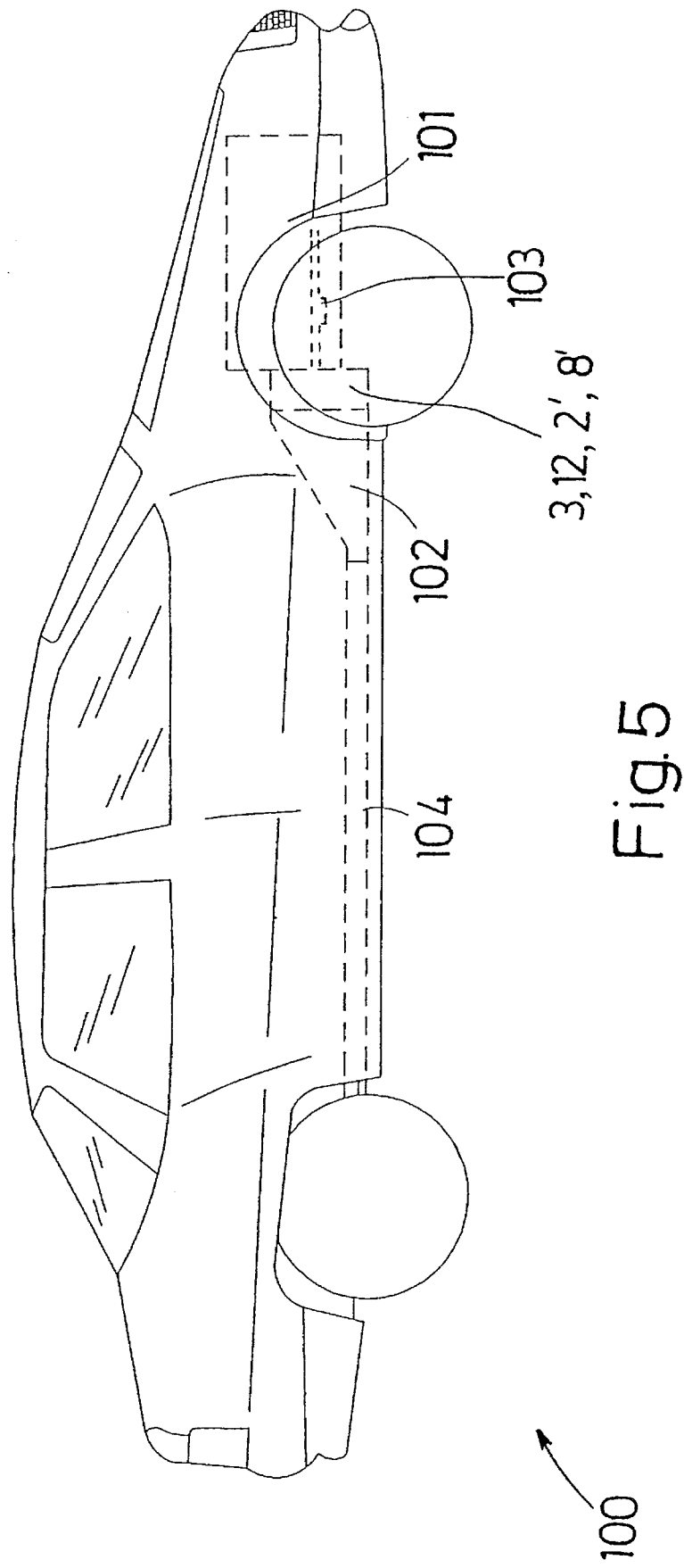

TWO MASS FLYWHEEL FOR A MOTOR VEHICLE TRANSMISSION HAVING A SEPARATE THRUST BEARING BETWEEN THE TWO MASSES

This application is a continuation-in-part of co-pending application Ser. No. 08/322,598, filed Oct. 13, 1994 in the names of Bernhard Schierling, Ralf Till and Jörg Sudau, the inventors herein, assigned to the assignee of the present invention, and entitled "A Two Mass Flywheel For a Motor vehicle Transmission", which application is incorporated by reference herein.

BACKGROUND OF THE INVENTION

1. Field of the Invention

This invention generally relates to a two mass flywheel for a motor vehicle transmission. Such a two mass flywheel will typically have a first flywheel mass which can be connected to a crankshaft of an internal combustion engine, and the first flywheel mass can be configured to at least partially surround a hub which is a part of a second flywheel mass. The second flywheel mass can also have a portion which is connectable to a friction clutch for driving a transmission shaft. The first and second flywheel masses are configured to rotate in synchronization with one another, and can also generally be connected to one another in a manner which allows for a limited relative rotation between the two flywheels. The first flywheel can be provided with an axial bearing, or thrust bearing for the hub, and, in a circumferential area of the first flywheel, there can be a radial bearing for the hub.

2. Background Information

European Patent 0 476 707 A1 discloses a two mass flywheel, or a flywheel having two halves, wherein a first flywheel is connected to the crankshaft of an internal combustion engine. In the vicinity of its circumference, this first flywheel has a ring which projects laterally. On the inside of this ring there is a radial bearing for a hub, which hub can execute a limited relative rotation with respect to the first flywheel. This hub is also fastened to a second flywheel designed to hold, or engage, a clutch plate. The first flywheel, on its side facing the second flywheel, has a cover plate which supports a first axial, or thrust bearing for the hub and acts as a closure for a chamber surrounding the hub, which chamber is filled with grease. A second axial, or thrust bearing is located relatively close to the axis of rotation of the flywheels on a projection of the second flywheel, which second flywheel extends to the first flywheel.

The grease well of this flywheel device is designed so that the radial bearing is supplied with grease by means of a lubrication passage which runs between the first flywheel and the hub. Because the more centrally located thrust bearing is spatially separated from this lubrication passage, however, the supply of grease to the thrust bearing is less reliable, whereby the thrust bearing closer to the axis of rotation of the flywheels is affected in particular, because under the influence of centrifugal forces, the grease in the flywheel chamber is forced outwardly away from the axis of rotation. Consequently, significant wear of the thrust bearing can be expected.

On the known flywheel device, the two thrust bearings are located in an area of the hub which lies between the axis of rotation of the flywheels and the radial bearing. This positioning, however, provides only a relatively small distance between at least one of the thrust bearings and the axis of rotation. Because of this small distance, the hub cannot be optimally supported against any wobbling motions initiated by the crankshaft of the internal combustion engine.

OBJECT OF THE INVENTION

The object of the present invention is to design an axial, or thrust bearing so that, on one hand, a sufficient supply of lubricant to the thrust bearing can essentially be guaranteed under all conditions, and on the other hand, so that optimal axial guidance for the hub can be possible.

SUMMARY OF THE INVENTION

The present invention teaches that this object can be achieved by providing a first flywheel for being connected to the crankshaft of an internal combustion engine, which first flywheel can be provided with an axial, or thrust bearing for a hub, and is designed in its circumferential area with a radial bearing for the hub, and by providing a second flywheel which can rotate in synchronization with the first flywheel, and can execute a limited relative rotation with respect to the first flywheel, wherein a thrust bearing is preferably provided with displacement limit stops for the hub, which limit stops extend on both sides of the hub to the radial bearing.

The radial bearing is often disposed inside the grease well at the greatest possible distance from the axis of rotation. Thus, as a result of the location of the thrust bearing adjacent to the radial bearing, grease which is transported under the effect of centrifugal forces toward the radial bearing can also get into the axial bearing. As such, the grease also provides for the lubrication of the thrust bearing.

Further, as a result of the displacement limit stops of the thrust bearing which extend along both sides of the hub to the radial bearing, the hub can preferably also be guided in the vicinity of the circumference of the hub. Thus, the axial guidance can preferably be provided at the greatest possible distance from the axis of rotation of the flywheels. Then, any wobbling motions, which, for example, might be initiated by the crankshaft of the internal combustion engine, can be transmitted with reduced reaction forces. In other words, any wobble which might be initiated can be significantly less than an amount of wobble which would occur in flywheels having this thrust bearing more centrally disposed.

Some additional advantageous embodiments of such a flywheel in halves can be provided by a flywheel having a primary plate on the one side of the hub, a cover plate on the other side of the hub, and a primary support which connects the primary plate to the cover plate. This support can preferably surround the two plates in a ring-shaped fashion. Such a configuration thereby forms an essentially disc-shaped chamber in which the hub can be located. This disc-shaped chamber preferably forms a grease well, which essentially surrounds the hub, for containing a substance having lubricating and damping properties, such as grease, to lubricate the thrust and radial bearings.

The primary support, which can then preferably be disposed circumferentially about the hub, can then preferably have, on its inside facing the hub, both the radial bearing and the thrust bearing. As such, the displacement limit stops of the thrust bearing can preferably be engaged on the hub in the radially outside peripheral area of the hub. With the above-discussed configuration, the thrust bearing and the radial bearing are located at least partly in the grease well.

An additional particularly simple embodiment of the thrust bearing has the displacement limit stops each preferably formed by a disc which can be centered on the radial bearing. Further, the displacement limit stops can each preferably be formed by a disc, which discs can preferably be centered on the inner edge of an encircling depression formed in the circumferential portion of the first flywheel.

In further alternate embodiments of the present invention, the elements designed for the axial support of the hub can also preferably be provided for radial support of the hub. Accordingly, the bearing elements can then preferably absorb forces applied both in the axial direction and in the radial direction. One configuration of bearing elements which can provide for such dual support can preferably be provided by a thrust bearing which has a two piece shell, with each piece comprising a two-legged shell portion with a leg extending on each side of the hub. A first leg of each bearing portion can preferably run parallel to the side of the hub, and can then act as a displacement limit stop, and a second leg can enclose the hub on the radial end of the hub. Alternately, the thrust bearing could preferably have a U-shaped bearing part which preferably has a first portion for holding the hub radially. On this first portion, there can then preferably be a leg on both sides of the hub, which leg extends from the first portion to act as a displacement limit stop for the hub. These legs can preferably be molded to the first portion.

Additional advantageous embodiments of the present invention can preferably allow for the capacity of the thrust bearing for grease, and thus the dynamic behavior of the hub, to be predetermined. One embodiment which can enable the capacity for grease to be altered can preferably be provided by a thrust bearing in which the portion of the bearing running radially about the hub can preferably be interrupted by recesses running in the axial direction. Alternatively, the legs which are disposed along the faces, or sides of the hub, can each preferably be interrupted by recesses oriented radially with respect to the axis of the hub. Still further, a combination of axial and radial recesses could be provided. The capacity of the thrust bearing for grease, and thus the dynamic behavior can then essentially be altered by changing the sizing of the recesses, and/or by changing the distance between each two segments.

Additionally, the thrust bearing can preferably be provided, on both sides of the hub, with segments which form the contact surface for the hub, and the hub, in the range of the thrust bearing, can preferably have segments which form a contact surface.

Further details regarding the present invention are presented herebelow with reference to the accompanying drawings. It should be understood that when the word "invention" is used in this application, the word "invention" includes "inventions". that is, the plural of "invention". By stating "invention", the Applicants do not in any way admit that the present application does not include more than one patentably and non-obviously distinct invention, and maintain the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a flywheel for an internal combustion engine of a motor vehicle for transmitting mechanical rotary power from an internal combustion engine to a transmission, the flywheel comprising: a first flywheel portion and a second flywheel portion, the second flywheel portion being disposed adjacent the first flywheel portion; the first flywheel portion comprising apparatus for non-rotationally connecting the first flywheel portion to a crankshaft of an internal combustion engine, the first flywheel portion being rotatable about an axis of rotation, the axis of rotation defining a first axial direction parallel to the axis of rotation, and a second axial direction opposite to the first axial direction; the second flywheel portion being rotatable about the axis of rotation; apparatus for connecting together the first flywheel portion and the second flywheel portion for rotating the second flywheel portion with the first flywheel portion; each of the first flywheel portion and the second flywheel portion comprising a peripheral portion disposed radially away from the axis of rotation; and the flywheel further comprises thrust bearing apparatus for limiting axial movement of the first flywheel portion with respect to the second flywheel portion in both of the first and second axial direction, the thrust bearing apparatus being disposed between the peripheral portions of the first and second flywheel portions.

Another aspect of the invention resides broadly in a flywheel device for an engine, the flywheel device comprising: first flywheel apparatus and second flywheel apparatus, the second flywheel apparatus being disposed adjacent the first flywheel apparatus; the first flywheel apparatus comprising apparatus for non-rotationally connecting the first flywheel apparatus to a rotating part of an internal combustion engine; the first flywheel apparatus being rotatable about an axis of rotation, the axis of rotation defining a first axial direction parallel to the axis of rotation, and a second axial direction opposite to the first axial direction; the second flywheel apparatus being rotatable about the axis of rotation; apparatus for connecting together the first flywheel apparatus and the second flywheel apparatus for rotating the second flywheel apparatus with the first flywheel apparatus; each of the first flywheel apparatus and the second flywheel apparatus comprising a peripheral portion disposed radially away from the axis of rotation; the peripheral portion of one of the first flywheel apparatus and the second flywheel apparatus at least partially surrounding the peripheral portion of the other of the first flywheel apparatus and the second flywheel apparatus; radial bearing apparatus disposed radially between the peripheral portions of the first and second flywheel apparatus for limiting radial movement of the second flywheel apparatus with respect to the first flywheel apparatus; and thrust bearing apparatus disposed between at least a portion of the first flywheel apparatus and at least a portion of the second flywheel apparatus for limiting axial movement of the second flywheel apparatus with respect to the first flywheel apparatus in the first and second axial directions; and the thrust bearing apparatus extending from the radial bearing apparatus radially inwardly toward the axis of rotation.

BRIEF DESCRIPTION OF THE DRAWINGS

The present invention is illustrated in greater detail below, with reference to the embodiments illustrated in the accompanying drawings, in which:

FIG. 5 depicts the general components of a motor vehicle power train.

DESCRIPTION OF THE PREFERRED EMBODIMENTS

Figure 1:
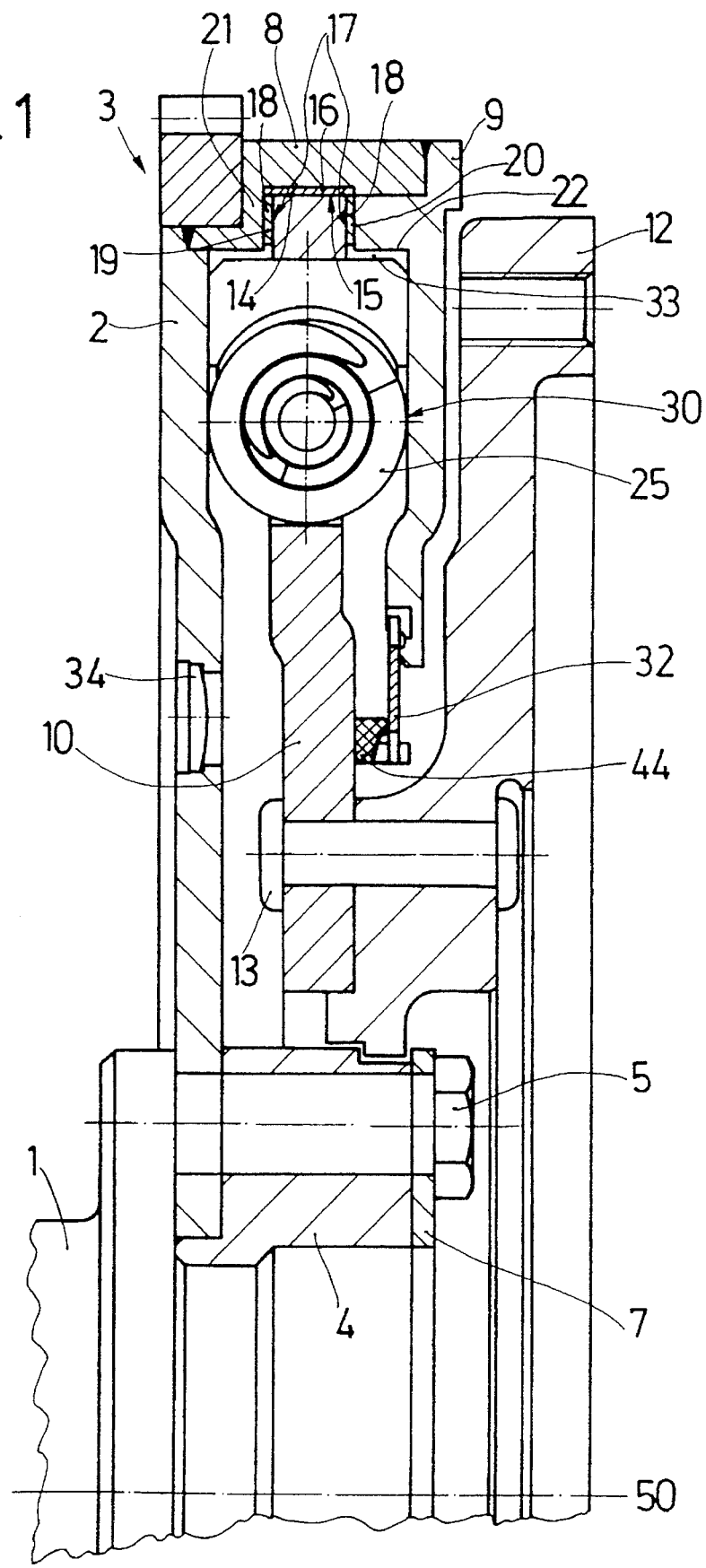
FIG. 1 shows a flywheel device in halves in partial longitudinal section, with a thrust bearing and a radial bearing on the first flywheel.

FIG. 1 shows a partial longitudinal section through a divided flywheel device, or two-mass flywheel for a motor vehicle. In the depicted embodiment, a primary plate 2 of a first flywheel 3 and a bearing flange 4 are fastened by means of screws 5 to a crankshaft 1, which crankshaft 1 would typically be a part of a motor vehicle engine (see 101, 103 in FIG. 5). Between the bearing flange 4 and the heads of several screws 5 distributed over the circumference of the bearing flange 4, there can preferably be a plate 7 which distributes the force introduced by the heads of screws 5 to the contact surface of the bearing flange 4.

The primary plate 2 of the first flywheel 3, in the vicinity of its circumference, can preferably support a ring-shaped primary support 8. This primary support 8 can preferably have an S-shaped cross section, and, on an end of the primary support 8 farther from the primary plate 2, a cover plate 9 can preferably be fastened. The primary plate 2, the primary support 8 and the cover plate 9, can thereby form a space 33. In this space 33 of the first flywheel 3, a hub 10 can preferably be located. This hub 10 can be fastened to a second flywheel 12. This second flywheel 12 can preferably be mounted rotationally about the bearing flange 4 by means of rivets 13, distributed radially about the circumference of the bearing flange 4, to connect the second flywheel 12 to hub 10.

The radial sizing of the hub 10 can essentially be selected so that the hub 10 is engaged, in its circumferential area, in a depression 14 made on the inside of the primary support 8. This depression 14 can preferably hold a radial bearing 15, which can be configured in the shape of a ring 16. This ring 16 can preferably follow the contour of the primary support 8. In addition, the depression can also preferably hold an axial, or thrust bearing 17, which axial bearing can be designed with displacement limit stops 18 for the hub 10, with one displacement limit stop 18 preferably on each side of the hub 10. These displacement limit stops 18 can each preferably be in the form of a disc 19, 20. As such, the disc 19 can come into contact laterally against a web 21 of the primary support 8, and the disc 20 can come into contact against a projection 22 of the cover plate 9.

Figure 1A:
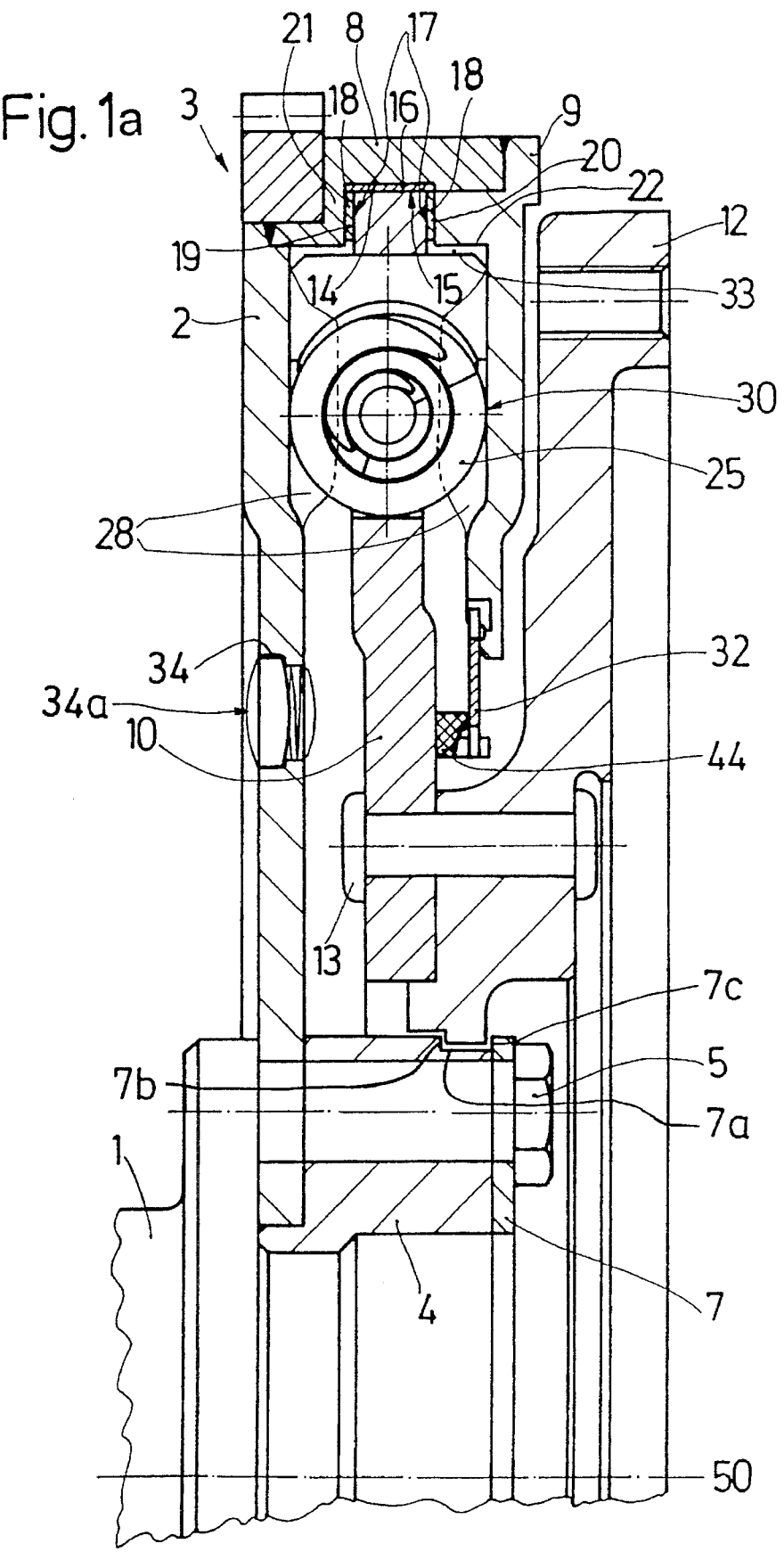
FIG. 1a shows an alternative view of a flywheel device similar to the flywheel device of FIG. 1.
Figure 2:
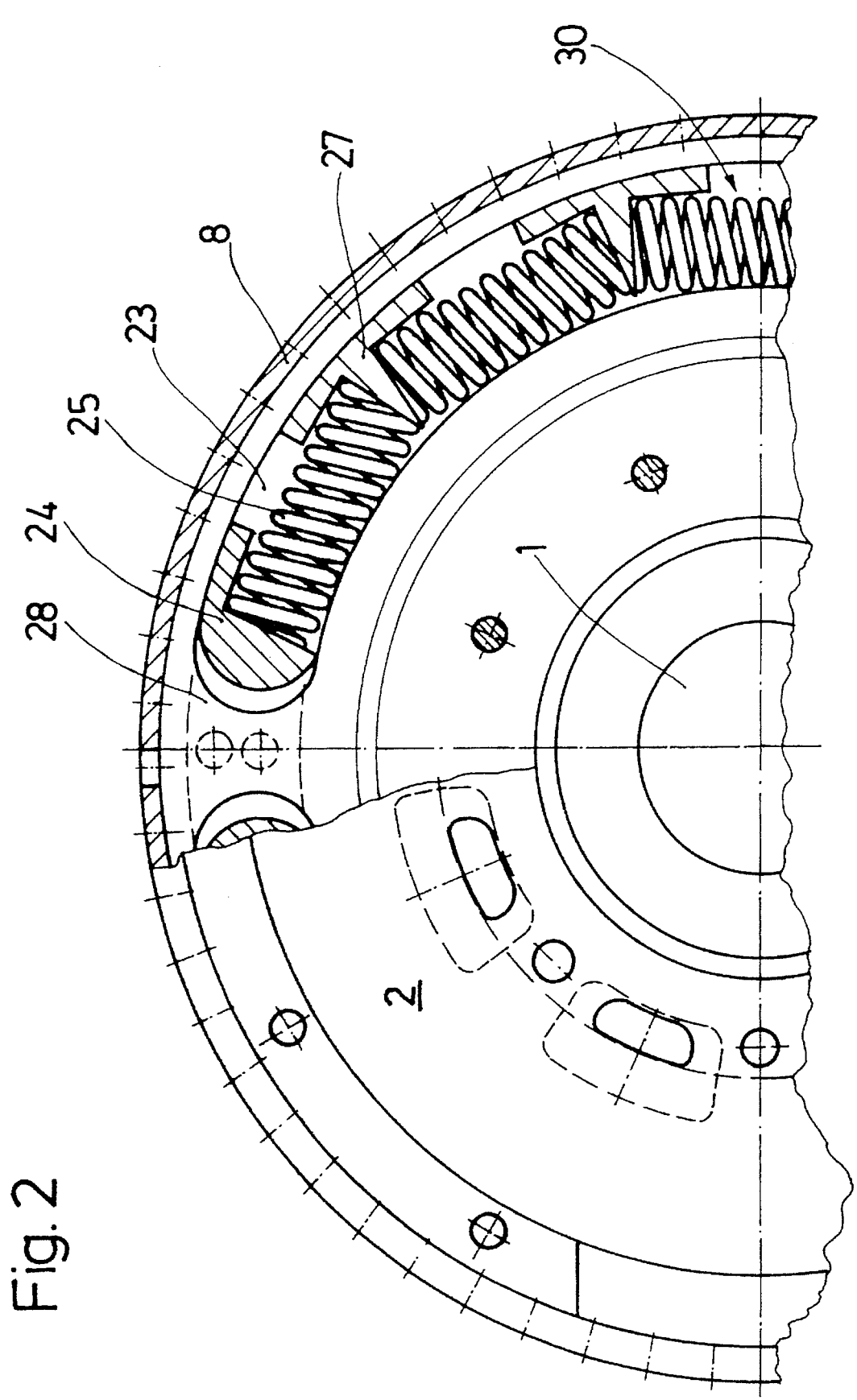
FIG. 2 shows the flywheel device in a front view, in partial cross section.

Within the hub 10, there can preferably be semi-circular recesses 23 as shown in FIG. 2. In these recesses 23, springs 25, spring plates 24 for engaging with the springs 25, and guide shoes 27 for engaging with the springs 25, can preferably be located. The spring plates 24 can preferably be placed in contact with stops 28 of the first flywheel 3. One possible embodiment of the stops 28 is further depicted in FIG. 1a. Changes in torque on the crankshaft 1, and thus on the first flywheel 3, can cause a deformation of the springs 25 with a displacement of the guide shoes 27 inside the respective recesses 23. When the springs 25 are deformed, the springs 25, as well as the displaceable grease surrounding them, are part of a torsion damping mechanism 30.

As shown in FIG. 1, at a radially inward end of the cover plate 9, towards the axis of rotation 50 of the flywheels 3, 12, a prestressed, curved washer 32 can preferably be non-rotationally connected. This curved washer 32 can also preferably be non-rotationally connected, at its opposite side, to a ring-shaped seal 44. Thus, as a result of the prestress, the curved washer 32 can bias the seal 44 into engagement against the hub 10. Consequently, on one hand, as a result of the frictional connection between the seal 44 and the hub 10, the rotational movements of the hub 10 can be reduced when torque fluctuations occur, and thus a complete utilization of the spring travel of the springs 25 can be prevented, and on the other hand, the space 33, filled with grease and surrounding the hub 10, can be sealed to prevent the escape of the grease. To fill this chamber 33, there can preferably be an opening 34 in the primary plate 2. This opening 34 can preferably be closed by means of a plug 34a as shown in FIG. 1a.

The plate 7 on the bearing flange 4, in conjunction with the bearing flange 4, can preferably be configured to form an emergency centering device for the second flywheel 12. For this purpose, in a circumferential portion of the bearing flange 4, as detailed in FIG. 1a, there can preferably be a radially inwardly stepped portion 7a which thereby forms a radially disposed wall 7b. The ends of the plate 7 can then preferably be configured to project radially beyond the outer circumference of the bearing flange 4 to form radial wall 7c. As such, the radially stepped portion 7a, in combination with the walls 7b and 7c, can preferably form a guide channel. Then, in the event that the second flywheel 12 were to come loose from the bearing flange 4, e.g. in the event of a forcible rupture of the rivets 13, the second flywheel 12 could still be held axially from coming off the bearing flange 4 by means of the wall 7c. The same components can also serve to provide an emergency centering in the radial direction between the flange 4 and the flywheel 12.

The second flywheel 12, possibly in the manner as discussed further below with reference to the flywheel illustrated in FIG. 4, preferably supports both a clutch housing and a corresponding friction clutch with a clutch plate. Thus, an emergency centering of the clutch housing, and friction clutch, etc., can also be provided in the axial and radial directions by means of the channel formed by walls 7a, 7b and 7c.

Figure 3:
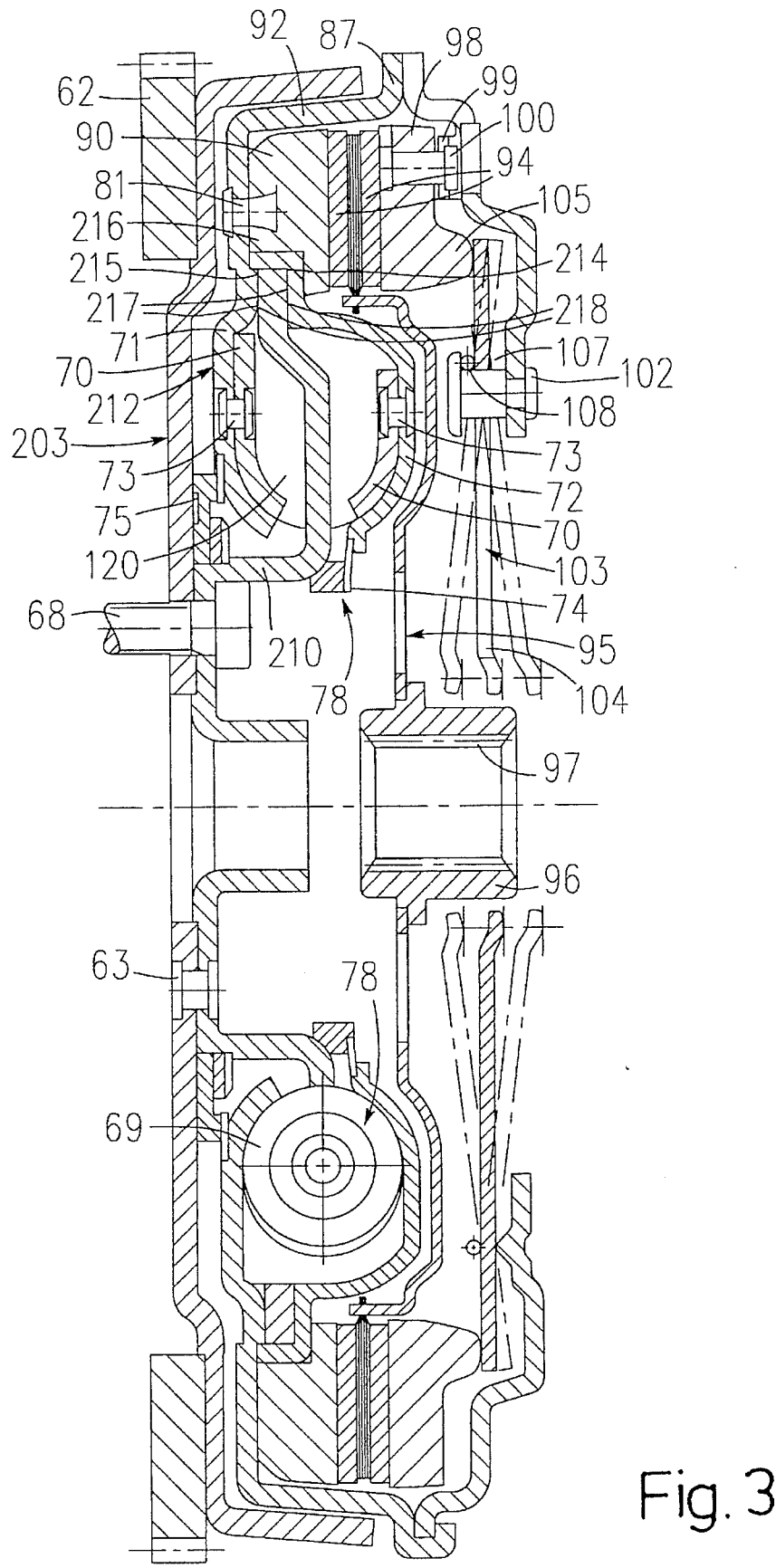
FIG. 3 shows a longitudinal section through an alternative embodiment of a flywheel device wherein the axial bearing and radial bearing are on the second flywheel.

FIG. 3 shows an alternative configuration of a flywheel device in accordance with another embodiment of the present invention wherein, the radial bearing 215 and the axial bearing 217 are provided on the second flywhel 212. The configuration of the bearings 215, 217 can essentially be the same as the configuration thereof in the embodiment described above, so that in FIG. 3, the ring 216 and the displacement limit stops 218 are illustrated only by means of thick lines.

The flywheel device illustrated in FIG. 3 has a first flywheel 203, which first flywheel 203 can preferably have a starter rim 62 in the radially outer area. The first flywheel 203 can be connected in the radially inner region to the hub disc 210 by means of rivets 63. The first flywheel 203 and the hub disc 210 can be fastened by means of bolts 68 to a drive mechanism (not shown), such as the crankshaft of an internal combustion engine.

The hub disc 210 can preferably be engaged in the radially middle region with springs 69. The spring 69 can preferably be acted on by control edges 70, which control edges 70 can be fastened by means of rivets 73 to cover plates 71 and 72. The cover plates 71 and 72 can preferably be permanently connected together by welding at a location disposed radially outside the hub disc 210. At the connection point, or in the vicinity of the area where the cover plates 71 and 72 are connected together, the cover plates 71 and 72 can preferably form a depression 214. In this depression 214, the ring 216 of the radial bearing and the displacement limit stops 218 of the axial bearing 217 can be located. Also in this depression 214, the hub disc 210 can be guided with its radially outer edge against movements in the axial direction and in the radial direction.

Radially inside the springs 69, the cover plate 72 can preferably be engaged with a basic friction device 74, and the cover plate 71 can preferably be engaged with a floating friction device 75. The spring elements 69, like the basic friction device 74 and the floating friction device 75, are essentially part of a torsional vibration damper 78. This damper arrangement 78 can preferably be enclosed by the cover plates 71 and 72, and preferably has a chamber 120 which is filled with grease for the damping of excursion movements of the spring elements 69. The chamber 120, on its radially outer end, can preferably have a connection to the radial bearing 215 and to the axial bearing 217, so that grease contained in the chamber 120 can be transported radially outward during operation of the flywheel device, to thus reach the two bearings 215, 217. The result can then generally be a lubrication of both of the bearings 215, 217.

The cover plates 71 and 72, which can be movable in relation to the hub disc 210, generally act as, and form part of the second flywheel 212 of the flywheel device. The cover plate 71 essentially projects in the radial direction beyond the weld seam with the cover plate 72, radially outwardly, and the cover plate 71 can preferably be connected to a counterpressure plate 90 by means of a rivet 81. The above-mentioned radially outer end of the cover plate 71 can also preferably act as the clutch housing 87, which clutch housing 87 can preferably have a ring-shaped wall 92 which surrounds a counterpressure plate 90. A friction lining 94 of a clutch disc 95 can be brought into contact with the counterpressure plate 90. The clutch disc 95 can be non-rotationally located on, i.e. mounted on, or fastened to, a hub 96, which hub 96, on its inside diameter, preferably has a toothed portion 97. By means of this toothed portion 97, the clutch disc 95 can be non-rotationally connected to a transmission shaft (not shown).

The clutch disc 95, on its side facing away from the counterpressure plate 90, can preferably be brought into contact, by means of an additional friction lining 94, with an application plate 98. This application plate 98 can be non-rotationally connected by means of elastic means 99, such as cross-leaf springs, to the clutch housing 87, this connection can preferably permit axial movement of the application plate 98. The connections of the elastic means 99 to the application plate 98, on one end, and to the clutch housing 87, on the other end, can each be made by means of a rivet 100.

On the clutch housing 87, there can preferably be, radially farther inward, bearing journals 102 for a pressure application device 103, e.g. a membrane spring 104, which can be brought into contact in the radially outer area with a lug, or projection 105 of the application plate 98, and radially inwardly with a release device (not shown, but generally well known in the art). The application device 103 can preferably be held in its position, on one side, by tips 107 molded onto the clutch housing 87, and on the other side by means of a bearing ring 108.

For the configuration of the bearing claimed by the present invention, in addition to the embodiment as depicted in FIGS. 1–3, other embodiments are also possible. Some of these other embodiments of a bearing which can support the hub 10 against axial forces which occur during the engagement or disengagement of the clutch and during operation, are illustrated in FIGS. 3a to 3g. These devices are essentially described hereinbelow with reference to the flywheel device illustrated in FIGS. 1 and 2, but can also be used in the embodiment illustrated in FIG. 3.

Figure 3A:
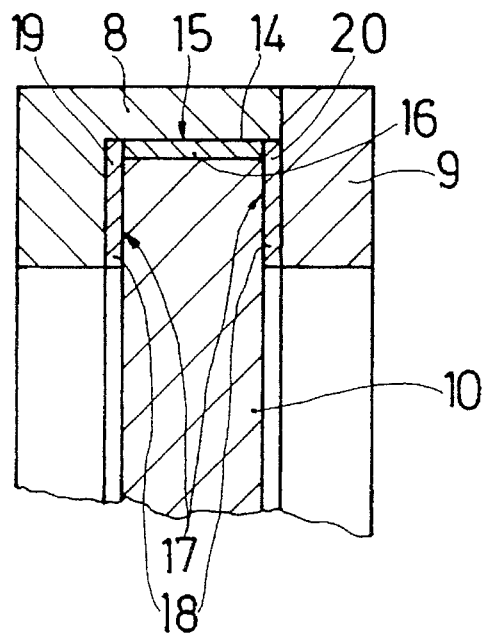
FIG. 3a shows an embodiment in which the axial bearing is guided radially outwardly on the corresponding centrifugal mass.

In the embodiment as shown in FIG. 1, the radially outer edges of the discs 19 and 20, which discs 19, 20 act as displacement limit stops 18 for the hub 10, radially contact the ring 16 which forms the radial bearing 15. On the other hand, FIG. 3a shows an embodiment in which the discs 19, 20 project all of the way to the inner edge of the primary support 8, and are in contact axially with the radial bearing 15 on both sides of the ring 16.

Figure 3B:
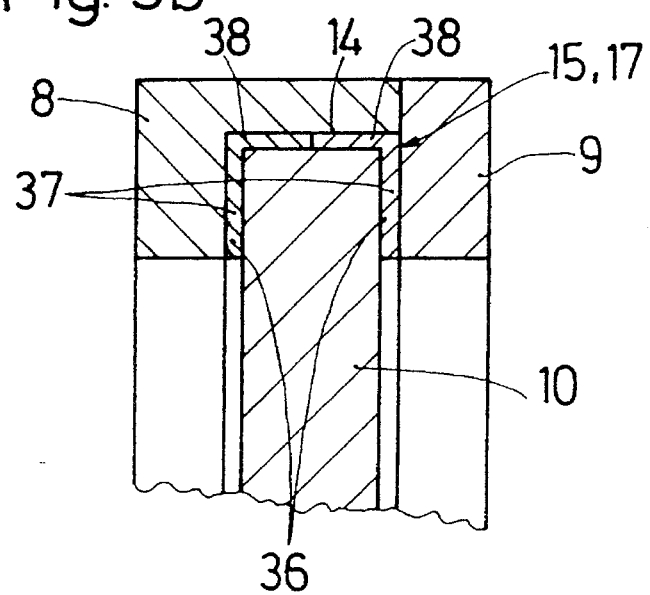
FIG. 3b is similar to FIG. 3a, but with two symmetrical shells, each of which acts as an axial and radial bearing.

The embodiment illustrated in FIG. 3b has two ring-shaped shells which preferably have an L-shaped cross section. On each of the two sections, there can preferably be a leg 37 parallel to the hub 10 which forms the axial contact surface for the corresponding side of the hub 10. In addition, a corresponding vertical leg 38 can be used for the radial guidance of the hub 10.

Figure 3C:
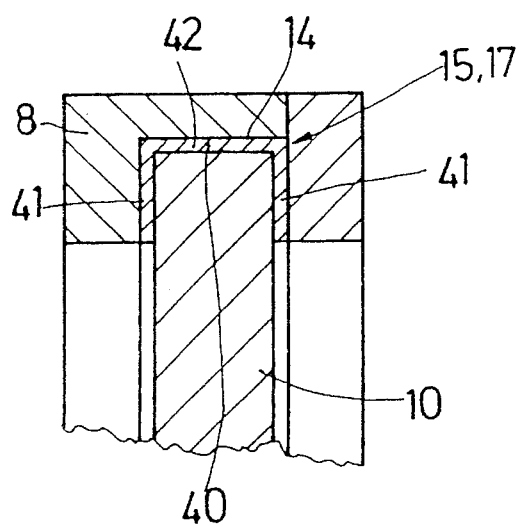
FIG. 3c is similar to FIG. 3b, but in one piece.

FIG. 3c shows a bearing shell 40 which preferably has a U-shaped cross section. In this embodiment, legs 41, on both sides of the hub 10, provide for the axial guidance of the hub 10, and a central bearing portion 42 provides the radial guidance.

Figure 3D:
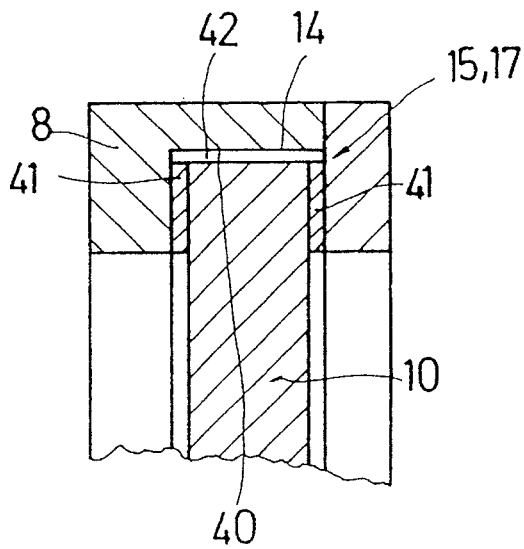
FIG. 3d is similar to FIG. 3c, but with recesses in the radial bearing which run in the axial direction.
Figure 3E:
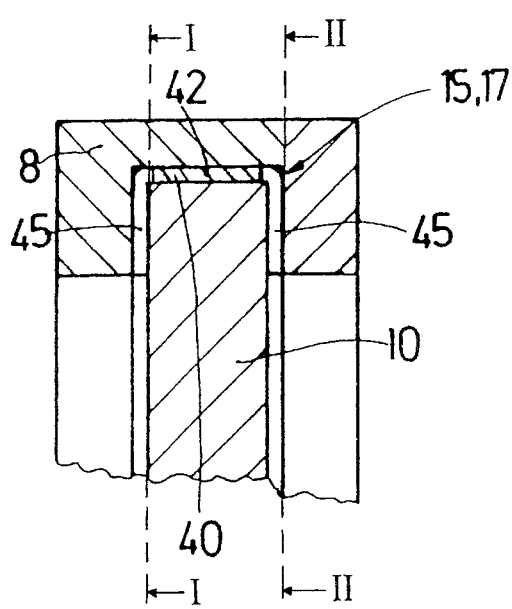
FIG. 3e is similar to FIG. 3c, but with recesses in the axial bearing which run in the radial direction.
Figure 3F:
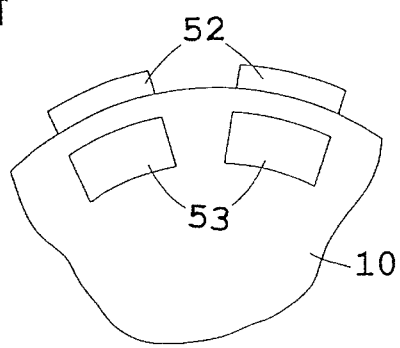
FIG. 3f shows a cross section of the centrifugal mass along Line I—I in FIG. 3e, with segments on an inside radius and on a side wall.
Figure 3G:
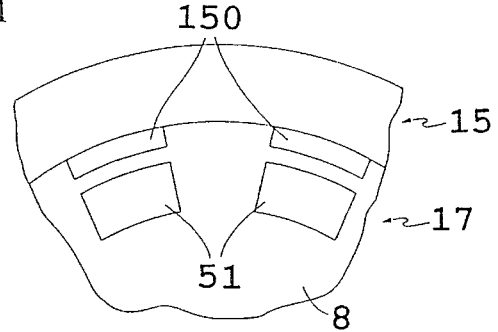
FIG. 3g shows a section of a hub disc along Line II—II in FIG. 3e, with segments in the circumferential area and on a side wall.

This central bearing portion 42 can be interrupted, as illustrated in FIG. 3d, for a better fit on the inside of the primary support 8, by recesses which run parallel to the axis of rotation 50 (FIG. 1) of the flywheels 3, 12. FIG. 3e shows one embodiment of the bearing, in which, in contrast to the embodiment illustrated in FIG. 3c, the legs 41 parallel to the corresponding sides of the hub can have interruptions running in the radial direction which form tabs 45. This embodiment also fits the inside of the primary flywheel 3 particularly well. Likewise, as shown in FIGS. 3f and 3g, instead of a bearing which surrounds the hub 10 axially or radially, only segments of one of the bearing elements described above can be provided between the first flywheel 3 and the hub 10. These bearing segments can preferably optionally be fastened to the inside of primary support 8 of the flywheel 3, 12 (segments 150, 51) or to the hub 10 (segments 52, 53) in the circumferential portion of the hub 10.

Figure 4:
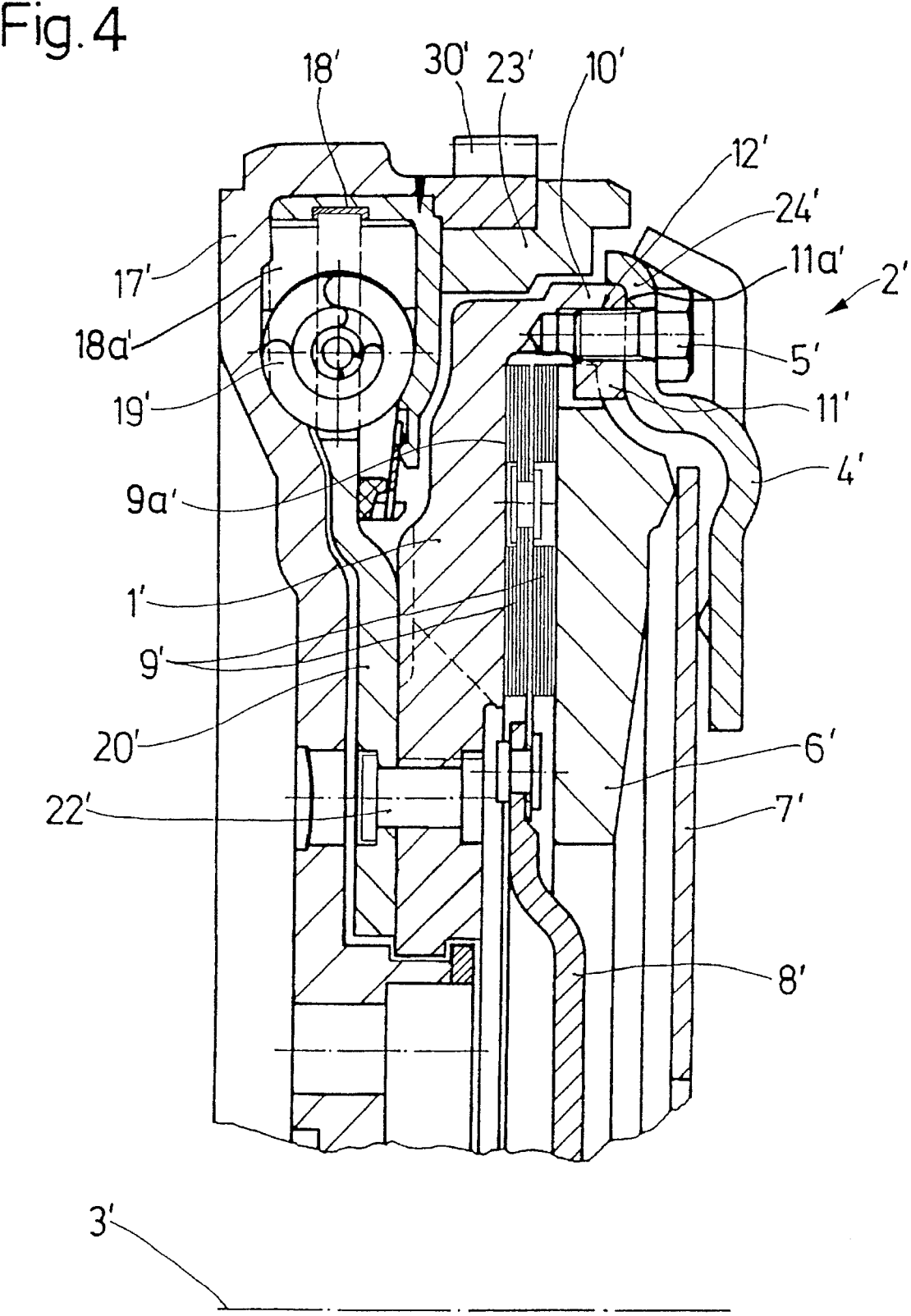
FIG. 4 shows an alternative view of a flywheel device in combination with a friction clutch.

A further depiction of a flywheel in combination with a friction clutch is shown in FIG. 4. In the embodiment of FIG. 4, a primary centrifugal mass 17' can preferably be bolted directly to a crankshaft of an internal combustion engine (not shown). The primary centrifugal mass 17' can preferably include a cover 18', rigidly connected to the primary centrifugal mass 17'. The primary centrifugal mass 17' and the cover 18' can thus form a torus-like chamber 18a", preferably concentric to an axis of rotation 3'. In this chamber 18a', several coil springs 19' can be disposed. A hub disc 20' can preferably extend into the torus-like chamber 18a', preferably in the radial direction, whereby the coil springs 19' can preferably be activated both by the hub disc 20', and by the primary centrifugal mass 17' and the cover 18'. The hub disc 20' can preferably be rigidly connected with a flywheel 1', preferably in the radially inner portion of the hub disc 20', by means of rivets 22'. Flywheel 1∝ can preferably be part of a secondary centrifugal mass. The flywheel 1' can be supported in relation to the primary centrifugal mass 17', preferably by means of a bearing as discussed above with reference to FIGS. 3a through 3e, but the flywheel 1' is preferably mounted so that it can rotate in relation to the primary centrifugal mass 17', preferably against the force of the coil springs 19'.

On the flywheel 1', preferably in the radially outer portion of the flywheel 1', there can preferably be an axially extending concentric wall 10'. The concentric wall 10' can surround the friction lining 9'of a clutch disc 8', preferably with a slight radial clearance. There can be a number of lugs 11' preferably disposed at an axial distance from a friction surface 9a' between the friction lining 9' and the flywheel 1'. The lugs 11' can preferably be distributed over the circumference of the concentric wall 10' and point radially inward. Threads 12' of threaded fasteners 5' can preferably be located in the vicinity of the lugs 11'.

A pressure plate 2' of a friction clutch can preferably be releasably fastened to the flywheel 1' by means of the threaded fasteners 5'. A clutch housing 4' can thereby be equipped with a flange 24', which flange 24' can extend radially outward, and which flange 24' can be in contact with a corresponding radial surface 11a' of the flywheel 1'. The radial surface 11a' of the flywheel 1' can preferably be formed by the concentric wall 10' and by the lugs 11'. The pressure plate 2' preferably also has a thrust plate 6'. The thrust plate 6' can preferably be connected so that it is essentially torsionally stationary but can move axially, preferably with the clutch housing 4'. The thrust plate 6' can then be pressurized by a membrane spring 7', which membrane spring 7' can preferably be braced both on the thrust plate 6' and also on the clutch housing 4'. The thrust plate 6', by means of the membrane spring 7' can then preferably engage the friction linings 9' of the clutch disc 8' with the rotating flywheel 1', thereby also causing the clutch disc 8' to rotate. The clutch disc 8' can then, in turn cause a shaft of a transmission (not shown) to rotate with the engine.

About an exterior periphery of the circumference of the flywheel 1', for example on an axial flywheel part 23', there can preferably be a toothed portion 30', which toothed portion 30' can be engaged by a starter (not shown) of a motor vehicle to provide motion to the engine parts, for example, while combustion is being initiated.

FIG. 5 shows what could be considered to be a typical automobile 100, which automobile 100 can include an internal combustion engine 101, which can be mounted in a forward portion of the automobile 100. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via drive shaft 104. If the automobile has a manual transmission 102, the flywheels 3, 12, pressure plate 2', and clutch disc 8' of the present invention may also be included for engaging the transmission 102 with the engine 101.

One feature of the invention resides broadly in the divided, or split flywheel device, that is, a flywheel in halves, which has a first centrifugal mass preferably engaged on the crankshaft of an internal combustion engine, and a second centrifugal mass connected to the former by means of a torsional vibration damper, whereby the second centrifugal mass is capable of a limited relative moment in relation to the first centrifugal mass, whereby one of the centrifugal masses is equipped with an axial bearing and with a radial bearing for a hub disc of the torsional vibration damper, characterized by the fact that the axial bearing 17 is provided with displacement limit stops 18 for the hub disc 10 which extend on both sides of the hub disc 10 to the radial bearing 15.

Another feature of the invention resides broadly in the divided flywheel device characterized by the fact that one of the two centrifugal masses 3, 12 has at least one depression 14, preferably in the circumferential area of the hub disc 10, in which depression 14 both the radial bearing 15 and the axial bearing 17 are located.

Yet another feature of the invention resides broadly in the divided flywheel device with a grease chamber contained in the torsional vibration damper and at least partly surrounding the hub disc, characterized by the fact that the axial bearing 17 and the radial bearing 15 are located at least partly in the grease chamber 33, 120.

Still another feature of the invention resides broadly in the divided flywheel device characterized by the fact that the displacement limit stops 18 of the axial bearing 17 are each formed by a disc 19, 20 which can be centered on the radial bearing 15.

A further feature of the invention resides broadly in the divided flywheel device characterized by the fact that the displacement limit stops 18 are each formed by a disc 19, 20 which can be centered on the depression 14.

Another feature of the invention resides broadly in the divided flywheel device characterized by the fact that the axial bearing 17 has a two-legged shell 36 on each side of the hub, whereby one leg 37 which acts as a displacement limit stop 18 runs parallel to the side of the hub disc 10, and the other leg 38 encloses the hub disc 10.

Yet another feature of the invention resides broadly in the divided flywheel device characterized by the fact that the axial bearing 17 has a bearing part 42 which acts as a radial locator for the hub disc 10, and legs 41 are molded onto this bearing part 42, on both sides of the hub disc 10, as a displacement limit stop 18 for the hub disc 10.

Still another feature of the invention resides broadly in the divided flywheel device characterized by the fact that the bearing part 42 is interrupted by recesses 45 which run in the axial direction.

A further feature of the invention resides broadly in the divided flywheel device characterized by the fact that the legs 37, 41 are each interrupted by recesses which are oriented radially with respect to the hub axis.

Another feature of the invention resides broadly in the divided flywheel device characterized by the fact that the axial bearing 17 is provided on at least one side of the hub disc 10 with segments 51 for the formation of a contact surface for the hub disc 10.

Yet another feature of the invention resides broadly in the divided flywheel device characterized by the fact that the hub disc 10 has segments 53 to form a contact surface in the area over which the axial bearing 17 extends.

Still another feature of the invention resides broadly in the divided flywheel device characterized by the fact that the radially outer edge of the hub disc 10 is provided with segments 52.

A further feature of the invention resides broadly in the divided flywheel device characterized by the fact that the radial bearing 15 on its inside has segments 150 for the formation of the contact surface for the hub disc 10.

Yet still another feature of the invention resides broadly in the flywheel in halves with a first flywheel which is connected to the crankshaft of an internal combustion engine, is provided with a thrust bearing for a hub and is designed in the circumferential area with a radial bearing for the hub, and a second flywheel which can rotate in synchronization with the first flywheel and can execute a limited relative rotation with respect to the first flywheel, characterized by the fact that the thrust bearing 17 is provided with displacement limit stops 18 for the hub 10 which extend on both sides of the hub 10 to the radial bearing 15.

Some examples of transmissions in which the present invention may be incorporated may be disclosed by the following patents U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies which could possibly be used in conjunction with the present invention may be disclosed in the following U.S. Patents: 4,684,007 to Maucher, entitled "Clutch Plate"; 4,635,780 to Wiggen, entitled "Clutch Disc for a Motor Vehicle Friction Clutch"; and 4,651,857 to Schraut et al., entitled "Clutch Disc Unit for a Motor Vehicle Clutch".

Some examples of two-mass flywheels and the components thereof which may incorporate the present invention therein may be disclosed by the following U.S. Patents: 5,103,688 to Kuhne, entitled "Two-Mass Flywheel"; 4,777,843 to Bopp, entitled "Two-Mass Flywheel Assembly With Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Applications Nos. P 43 35 207.3 and P 44 32 625.4, having inventors Bernhard Schierling, Ralf Till and Jörg Sudau, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A flywheel for an internal combustion engine of a motor vehicle for transmitting mechanical rotary power from an internal combustion engine to a transmission, said flywheel comprising:

a first flywheel portion and a second flywheel portion, said second flywheel portion being disposed adjacent said first flywheel portion;

said first flywheel portion comprising means for non-rotationally connecting said first flywheel portion to a crankshaft of an internal combustion engine;

said first flywheel portion being rotatable about an axis of rotation, said axis of rotation having a first axial direction parallel to said axis of rotation, and a second axial direction opposite to the first axial direction;

said second flywheel portion being rotatable about said axis of rotation;

means for connecting together said first flywheel portion and said second flywheel portion for rotating said second flywheel portion with said first flywheel portion;

each of said first flywheel portion and said second flywheel portion comprising a peripheral portion disposed radially away from the axis of rotation;

a bearing being disposed to permit and facilitate rotation between said first flywheel portion and said second flywheel portion; and said bearing being disposed between said peripheral portions of said first and second flywheel portions.

2. The flywheel according to claim 1, wherein said bearing is a lubricated bearing.

3. The flywheel according to claim 2, wherein:

said bearing comprises a radial bearing for limiting radial movement of said first flywheel portion with respect to said second flywheel portion;

said peripheral portion of one of: said first flywheel portion and said second flywheel portion comprises a peripheral portion at least partially surrounding said peripheral portion of the other of: said first flywheel portion and said second flywheel portion;

said surrounding peripheral portion comprises a depression therein for receiving said surrounded peripheral portion of the other of said first and second flywheel portions therein; and said radial bearing being disposed in said depression.

4. The flywheel according to claim 3, wherein:

said means for connecting together said first flywheel portion and said second flywheel portion comprises torsional vibration damper means for damping relative rotational movement between said first and second flywheel portions;

said first and second flywheel portions define a chamber therebetween, said chamber comprising a lubricating medium therein;

said radial bearing is at least partially disposed in said chamber, thus being lubricated by said lubricating medium; and said torsional vibration damper being disposed within said chamber.

5. The flywheel according to claim 4, wherein:

said depression comprising an annular groove, said annular groove comprises a base surface;

said radial bearing comprises one of:

a plurality of bearing elements; and a ring-shaped bearing element disposed adjacent said base surface of said annular groove;

said ring-shaped bearing element disposed between said surrounding peripheral portion and said surrounded peripheral portion.

6. The flywheel according to claim 5, wherein:

said surrounded peripheral portion comprises a portion disposed adjacent said base portion of said annular groove; and said one of: said plurality of bearing elements, and said ring-shaped bearing element is disposed on one of:

said base surface of said annular groove; and said surrounded peripheral portion adjacent said base surface.

7. The flywheel according to claim 6, wherein said first flywheel portion comprises:

a first plate;

a second plate disposed substantially parallel to said first plate, and spaced apart axially from said first plate to define a chamber between said first plate and said second plate; and means for non-rotationally connecting said first plate to said second plate; said second flywheel portion comprises:

a third plate disposed between said first plate and said second plate of said first flywheel portion;

a fourth plate disposed substantially parallel to said third plate and spaced apart from said third plate, said second plate extending between said third plate and said fourth plate; and means for non-rotationally connecting said third plate to said fourth plate;

said surrounding peripheral portion of said one of: said first flywheel portion and said second flywheel portion comprises a corresponding one of:

said means for non-rotationally connecting said first plate to said second plate of said first flywheel portion; and said means for non-rotationally connecting said third plate to said fourth plate of said second flywheel portion; and said surrounded peripheral portion of the other of: said first flywheel portion and said second flywheel portion comprises a corresponding one of:

a peripheral edge of said second plate of said first flywheel portion; and a peripheral edge of said third plate of said second flywheel portion.

8. The flywheel according to claim 7, wherein:

said second plate comprises an outer peripheral portion, said outer peripheral portion of said second plate comprises said surrounded peripheral portion, and said second plate comprises an inner portion disposed radially inwardly of said outer peripheral portion;

said second plate being fastened to said first plate at said inner portion of said second plate by said means for non-rotationally connecting said second plate to said first plate;

said third plate comprises an outer peripheral portion, said third plate comprises an inner portion disposed radially inwardly of said outer peripheral portion and between said first and second plates;

said fourth plate comprises an outer peripheral portion, and an inner portion disposed radially inwardly of the outer peripheral portion, said fourth plate being connected to said third plate at said outer peripheral portion of said fourth plate by said means for non-rotationally connecting said third plate to said fourth plate;

said third and fourth plates define said chamber containing lubricating medium therebetween; and said means for non-rotationally connecting said third plate to said fourth plate comprises said surrounding peripheral portion surrounding said outer peripheral portion of said second plate.

9. The flywheel according to claim 8, wherein:

said chamber defined by said third and fourth plates being substantially O-shaped in cross-section for substantially surrounding said outer peripheral portion of said second plate;

said third plate extending substantially radially from said outer peripheral portion of said third plate to said inner portion of said third plate, said inner portion of said third plate curving towards said second plate; and said outer peripheral portion of said fourth plate extending, at first, substantially axially away from said second plate, then extending substantially radially and parallel to said second plate, and finally said inner portion of said fourth plate curving towards said second plate.

10. The flywheel according to claim 2, wherein:

said bearing further comprises a thrust bearing for limiting axial movement of said first flywheel portion with respect to said second flywheel portion in both said first and second axial direction;

said peripheral portion of one of: said first flywheel portion and said second flywheel portion comprises a peripheral portion at least partially surrounding said peripheral portion of the other of: said first flywheel portion and said second flywheel portion;

said surrounding peripheral portion comprises a depression therein for receiving said surrounded peripheral portion of the other of said first and second flywheel portions therein; and said thrust bearing being disposed in said depression.

11. The flywheel according to claim 10, wherein:

said means for connecting together said first flywheel portion and said second flywheel portion comprises torsional vibration damper means for damping relative rotational movement between said first and second flywheel portions;

said first and second flywheel portions define a chamber therebetween, said chamber comprising a lubricating medium therein;

said thrust bearing being at least partially disposed in said chamber, thus being lubricated by said lubricating medium; and said torsional vibration damper being disposed within said chamber.

12. The flywheel according to claim 11, wherein:

said depression comprising an annular groove, said annular groove comprises a base surface and first and second side surfaces disposed spaced apart and extending from said base surface;

said thrust bearing comprises one of the following sets of features a) and b):

a) a first plurality of spaced apart bearing members disposed adjacent said first side surface of said annular groove between said surrounding peripheral portion and said surrounded peripheral portion, and a second plurality of spaced apart bearing members disposed adjacent said second side surface of said annular groove between said surrounding peripheral portion and said surrounded peripheral portion; and b) a first disc-shaped bearing member disposed adjacent said first side surface of said annular groove between said surrounding peripheral portion and said surrounded peripheral portion, and a second disc-shaped bearing member disposed adjacent said second side surface of said annular groove between said surrounding peripheral portion and said surrounded peripheral portion.

13. The flywheel according to claim 12, wherein:

said surrounded peripheral portion comprises a portion disposed adjacent said first side surface and said second side surface;

said one of: said first plurality of spaced apart bearing members, and said first disc-shaped bearing member is disposed on one of:

said first side surface of said annular groove; and said surrounded peripheral portion adjacent said first side surface, and said one of: said second plurality of spaced apart bearing members, and said second disc-shaped bearing member is disposed on one of:

said second side surface of said annular groove; and said surrounded peripheral portion adjacent said second side surface.

14. The flywheel according to claim 13, wherein said first flywheel portion comprises:

a first plate;

a second plate disposed substantially parallel to said first plate, and spaced apart axially from said first plate to define a chamber between said first plate and said second plate; and means for non-rotationally connecting said first plate to said second plate; said second flywheel portion comprises:

a third plate disposed between said first plate and said second plate of said first flywheel portion;

a fourth plate disposed substantially parallel to said third plate and spaced apart from said third plate, said second plate extending between said third plate and said fourth plate; and means for non-rotationally connecting said third plate to said fourth plate;

said surrounding peripheral portion of said one of: said first flywheel portion and said second flywheel portion comprises a corresponding one of:

said means for non-rotationally connecting said first plate to said second plate of said first flywheel portion; and said means for non-rotationally connecting said third plate to said fourth plate of said second flywheel portion; and said surrounded peripheral portion of the other of: said first flywheel portion and said second flywheel portion comprises a corresponding one of:

a peripheral edge of said second plate of said first flywheel portion; and a peripheral edge of said third plate of said second flywheel portion.

15. The flywheel according to claim 14, wherein:

said second plate comprises an outer peripheral portion, said outer peripheral portion of said second plate comprises said surrounding peripheral portion, and said second plate comprises an inner portion disposed radially inwardly of said outer peripheral portion;

said second plate being fastened to said first plate at said inner portion of said second plate by said means for non-rotationally connecting said second plate to said first plate;

said third plate comprises an outer peripheral portion, said third plate comprises an inner portion disposed radially inwardly of said outer peripheral portion and between said first and second plates;

said fourth plate comprises an outer peripheral portion, and an inner portion disposed radially inwardly of the outer peripheral portion, said fourth plate being connected to said third plate at said outer peripheral portion of said fourth plate by said means for non-rotationally connecting said third plate to said fourth plate;

said third and fourth plates define said chamber containing lubricating medium therebetween; and said means for non-rotationally connecting said third plate to said fourth plate comprises said surrounding peripheral portion surrounding said outer peripheral portion of said second plate.

16. The flywheel according to claim 15, wherein:

said bearing further comprises a radial bearing for limiting radial movement of said first flywheel portion with respect to said second flywheel portion; and said radial bearing being disposed in said depression.

17. The flywheel according to claim 16, wherein:

said radial bearing being at least partially disposed in said chamber, thus being lubricated by said lubricating medium;

said radial bearing comprises one of:

a plurality of bearing elements; and a ring-shaped bearing element disposed adjacent base surface of said annular groove;

said ring-shaped bearing element disposed between said surrounding peripheral portion and said surrounded peripheral portion;

said surrounded peripheral portion comprises a portion disposed adjacent said base portion of said annular groove;

said one of: said plurality of bearing elements, and said ring-shaped bearing element is disposed on one of:

said base surface of said annular groove; and said surrounded peripheral portion adjacent said base surface.

18. The flywheel according to claim 17, wherein:

said chamber defined by said third and fourth plates being substantially O-shaped in cross-section for substantially surrounding said outer peripheral portion of said second plate;

said third plate extending substantially radially from said outer peripheral portion of said third plate to said inner portion of said third plate, said inner portion of said third plate curving towards said second plate; and said outer peripheral portion of said fourth plate extending, at first, substantially axially away from said second plate, then extending substantially radially and parallel to said second plate, and finally said inner portion of said fourth plate curving towards said second plate.

19. The flywheel according to claim 18, wherein said one of: said first plurality of spaced apart bearing members, and said first disc-shaped bearing member, said one of: said second plurality of spaced apart bearing members, and said second disc-shaped bearing member, and said one of: said plurality of bearing elements, and said ring-shaped bearing element define a substantially U-shaped cross section in said annular groove.

20. The flywheel according to claim 19, wherein said thrust bearing comprises said first and second disc-shaped bearing members, and said radial bearing comprises said ring-shaped bearing element;

said first disc-shaped bearing member, said ring-shaped bearing element and said second disc-shaped bearing member comprise one of:

a) three separate bearing components for being disposed in said annular groove, a first component comprising said first disc-shaped bearing member, a second component comprising said second disc-shaped bearing member and a third component comprising said ring-shaped bearing element;

b) first and second separate L-shaped bearing components with each of said first and second L-shaped bearing components comprising:

at least a portion of said ring-shaped bearing element; and one of said first and second disc-shaped bearing members; and c) a single U-shaped bearing component having a base portion comprising said ring-shaped bearing element and first and second leg portions extending from said base portion with each of said first and second leg portions comprising one of said first and second disc-shaped bearing members.

21. The flywheel according to claim 20, wherein:

said second plate comprises a first axial side and a second axial side opposite said first side;

said first and second sides of said second plate being disposed adjacent said first and second sides of said annular groove;

said first and second disc-shaped bearing members have a radially inner edge disposed towards said axis of rotation;

at least one of said first disc-shaped bearing member, said second disc-shaped bearing member and said ring-shaped bearing element comprise openings therethrough, with openings in said ring-shaped element being disposed axially between said first and second disc-shaped bearing members, and openings in said first and second disc-shaped bearing members being disposed radially from said ring-shaped bearing element to said inner edge thereof;

said first plate comprises a first disc-shaped plate have a central opening therein;

said second plate comprises a cylindrical hub disposed about the axis of rotation and aligned within said central opening, said hub comprising said means for connecting said first flywheel portion to a crankshaft;

said third and fourth plates being limitably rotatable about said hub means with respect to said first and second plate;

said fourth plate further comprises means for sealing lubricating medium in said chamber, said means for sealing being disposed axially between said inner portion of said fourth plate and said inner portion of said second plate;

said means for sealing said chamber comprises a ring-shaped washer;

said second plate further comprises semi-circular openings therein disposed circumferentially about said second plate;

said torsional vibration damper comprises a plurality of springs disposed in said semi-circular openings;

said third and fourth plates comprising contact surfaces adjacent said semi-circular openings for contacting ends of said springs;

said outer peripheral portion of said third plate comprising means for being connected to a housing of a friction clutch;

said third plate comprises an axial surface for engaging with friction linings of a friction clutch; and said first plate comprises circumferential toothing disposed thereabout for engaging with a starter of an internal combustion engine.

* * * * *

UNITED STATES PATENT AND TRADEMARK OFFICE
CERTIFICATE OF CORRECTION

PATENT NO. : 5,601,492
DATED      : February 11, 1997
INVENTOR(S): Bernhard SCHIERLING, Ralf TILL and Jörg SUDAU It is certified that error appears in the above-indentified patent and that said Letters Patent is hereby corrected as shown below:

On the title page, item [56], under the U.S. PATENT DOCUMENTS section, before '4/1959', delete "288,062" and insert --2,880,626--.

On the title page, item [56], under the U.S. PATENT DOCUMENTS section, before '7/1963', delete "309,753" and insert --3,097,537--.

In column 8, line 34, after 'shells' insert --36--.

In column 9, line 4, after 'chamber', delete "18a"," and insert --18a',--.

In column 9, line 13, after 'Flywheel', delete "1α" and insert --1'--.

In column 10, line 54, after 'recesses' delete --45--.

Signed and Sealed this

Twentieth Day of May, 1997

Attest:

BRUCE LEHMAN

*Attesting Officer*   *Commissioner of Patents and Trademarks*